United States Patent [19]

Hilgeman

[11] Patent Number: 5,235,656
[45] Date of Patent: Aug. 10, 1993

[54] VARIABLE SPATIAL RESOLUTION FOCAL PLANE

[75] Inventor: Theodore W. Hilgeman, Centerport, N.Y.

[73] Assignee: Grumman Aerospace Corporation, Bethpage, N.Y.

[21] Appl. No.: 825,605

[22] Filed: Jan. 24, 1992

[51] Int. Cl.$^5$ .............................................. G06K 9/20
[52] U.S. Cl. .................................. 382/65; 250/208.1; 250/234; 382/62
[58] Field of Search ....................... 382/65, 62, 58, 66, 382/67, 68; 250/206.1, 206.2, 208.1, 216, 234

[56] References Cited

U.S. PATENT DOCUMENTS

| 5,020,118 | 5/1991 | Sugiura | 382/62 |
| 5,036,545 | 7/1991 | Iida et al. | 382/62 |
| 5,121,445 | 6/1992 | Tsujiuchi et al. | 382/62 |

Primary Examiner—Joseph Mancuso
Attorney, Agent, or Firm—Pollock, VandeSande & Priddy

[57] ABSTRACT

The light from a telescope impinges upon a tilted image plane. The plane primarily includes a mirror having a high spatial resolution focal plane imbedded therein. The mirror reflects image light rays to a lower spatial resolution focal plane. The detectors from the high spatial resolution focal plane and lower spatial resolution focal plane are connected to a computer which is capable of generating a display of the lower spatial resolution focal plane showing a general background scene as well as a superimposed display of the small high spatial resolution focal plane showing an enhanced image of a desired small area. The result is the minimization of the number of detectors that must be employed to obtain a satisfactory high spatial resolution area of interest with attendant minimization of computer processing time.

2 Claims, 2 Drawing Sheets

VARIABLE SPATIAL RESOLUTION FOCAL PLANE

FIELD OF THE INVENTION

The present invention relates to photodetector devices, and more particularly to a mosaic focal plane incorporating such devices.

BACKGROUND OF THE INVENTION

Optical images from telescopes may be transformed into electrical images by the utilization of mosaic focal planes incorporating a number of photo sensitive detectors, such as infrared or visual photo diodes. For mosaic focal planes, cost increases with increasing numbers of detectors. For a given area the number of detectors and hence the cost will increase with desired spatial resolution. Another problem with mosaic focal planes resides in the difficulty of obtaining sharp resolution over the entire focal plane. This is due to the fact that the sharpest resolution in a focal plane tends to be in the center.

Still further, large mosaic focal planes generally include millions of pixels requiring extensive computer processing which is an expensive proposition and quite time consuming. One could use the concept of a high spatial resolution portion of the focal plane surrounded by a low resolution outer ring. However, in order to move the high resolution portion to another area it would be necessary to tilt the whole sensor to another pointing direction and also to have extra detectors on the edge of the outer ring to accommodate the new position of the image. This concept has the difficulty of also requiring extra detectors. For very large sensors, the telescope cannot be quickly moved from one pointing direction to another because it would vibrate and cause a blurred image.

BRIEF DESCRIPTION OF THE PRESENT INVENTION

The present variable spatial resolution focal plane allows a high resolution portion of the focal plane to be moved anywhere in the image without requiring extra detectors. The remainder of the image continues to be detected at a lower resolution.

The concept of the present invention requires reimaging optics to reimage a reflection of an original image onto a low resolution focal plane. The image plane is designed to be operated tilted, relative to incoming light beams. A high resolution focal plane is imbedded into a larger image plane mirror and intercepts a portion of the image; the remainder being reflected to a low resolution focal plane located in spaced relation. The mirror high resolution focal plane assembly is moveable so as to intercept any region of the image. The high and low resolution focal planes are connected to a computer which scans the individual detectors of each plane and may selectively display either the low resolution focal plane overall image or the high resolution sectional image representing an area of the overall field of view. The display may also be configured as a split screen having two windows wherein the high resolution focal plane area of interest overlays the low resolution focal plane corresponding to the remaining field of view.

The beneficial advantages of the present invention reside in the requirement for fewer costly detectors, less need for costly and time consuming computer processing, as well as minimizing the vibration-caused delay in selecting a new field of regard experienced by the present state of the art.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
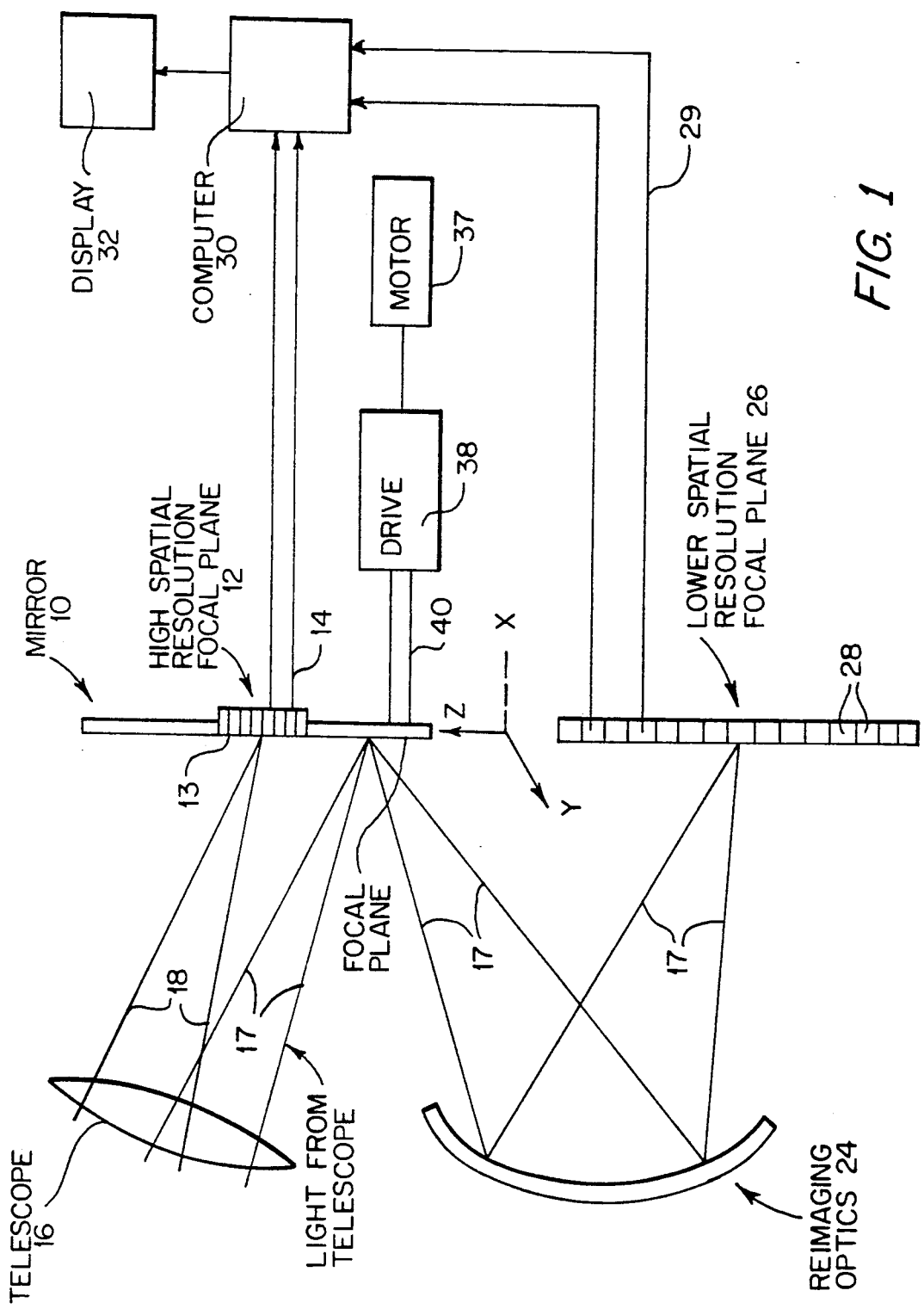
FIG. 1 is a diagrammatic illustration of the present invention.

FIG. 1 is a diagrammatic illustration of the present invention and is seen to include a mirror 10 which serves as an image plane of an optics assembly, such as telescope 16. The mirror is tilted with respect to the optical axis of the telescope so that a number of light rays 18 are absorbed by a high spatial resolution focal plane 12 imbedded within a central portion of the mirror 10. The remaining light rays 17 are reflected from the mirror for reimaging to a lower spatial image focal plane as will be discussed hereinafter.

The high spatial resolution focal plane 12 is comprised of a mosaic array of photodetecting devices 13, such as photo diodes. Focal plane 12 is preferably located in the center of the mirror 10. The individual detectors 13 are connected, via leads 14, to a conventional computer 30 which processes electrical signals from focal plane 12 representing the detected optical signal presented to the focal plane 12. Signals along leads 14, processed by computer 30, may be displayed upon a conventional CRT display 32. Thus far described, the display will be of high spatial resolution.

Figure 2:
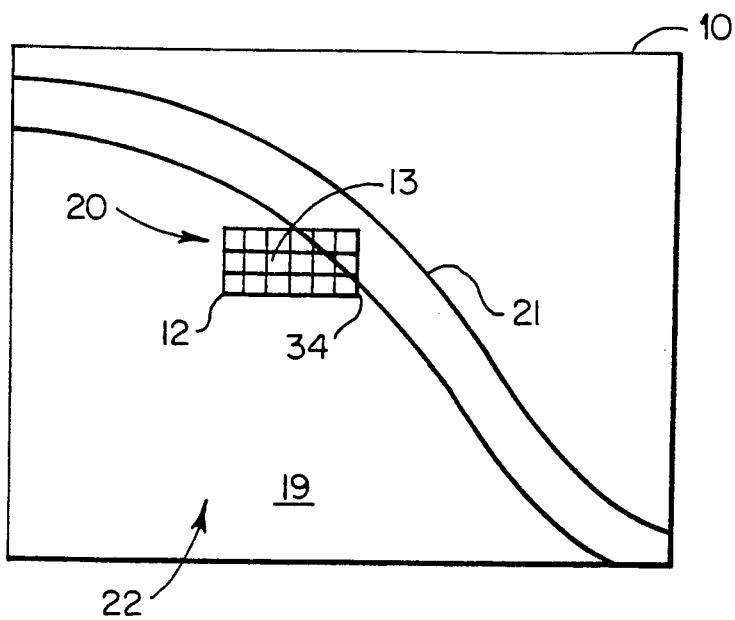
FIG. 2 is a diagrammatic illustration of an image being viewed by the invention.
Figure 4:
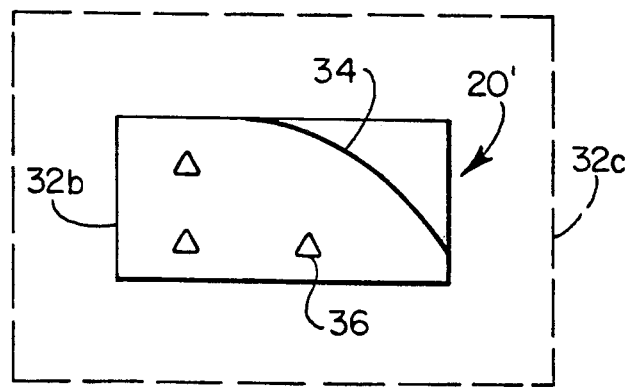
FIG. 4 is a diagrammatic illustration of a displayed high resolution section of an image being viewed.

FIG. 2 diagrammatically illustrates a resulting scene which is the telescope image on mirror 10. In FIG. 2, the scene 22 is seen to include a diagrammatically illustrated river 21 which is presented herein only as an example. Reference numeral 20 indicates a selected area of interest of the scene which falls in registry with the high spatial resolution focal plane 12. The remainder of the scene is indicated by number 19. As will be observed, the area of interest includes a portion of the left river bank indicated by reference numeral 34. The topographical details surrounding this river bank, within the special area of interest may be displayed as a high resolution display as indicated in FIG. 4. In the later mentioned figure the selected area of interest is generally indicated by reference numeral 20' and the river bank 34 becomes clarified to a degree permitting observation of additional topographical detail such as indicated by the symbols 36. However, since the relative area of the high resolution focal plane is small as compared with the remaining scene, it is important to display the overall scene with the high resolution area being used as a curser for partial high resolution viewing of the selected area.

Figure 3:
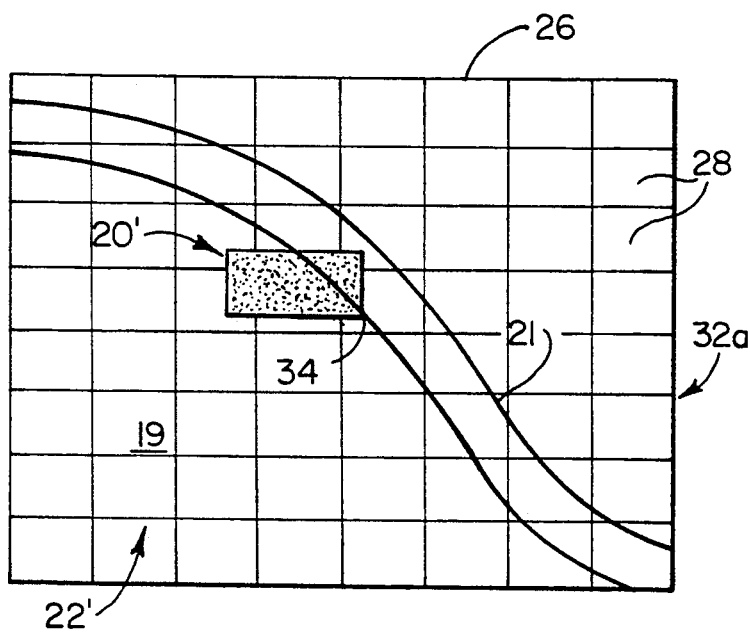
FIG. 3 is a diagrammatic illustration of a display indicating the field of view of an image.

This is accomplished by utilizing a lower spatial resolution focal plane 26 as shown in FIG. 1. The reflected image from reimaging optics 24 fall upon the lower spatial resolution focal plane 26 and the reimaged image appears as shown in FIG. 3. As will be immediately noticed, the concentration of detectors as indicated by the cells of the grids is considerably less than in the high resolution focal plane 12 (FIG. 2). This of course results in a lower pixel density and consequent lower resolution. The area of interest which is aligned with the high resolution focal plane 12 appears as a black area in FIG. 3 due to the fact that the high spatial resolution focal plane 12 absorbs the light rays falling upon it. The individual detectors 28 of the lower spatial resolution focal plane 26 are connected to the computer 30 via leads 29. The computer display 32 will selectively display (32a) an image of river 21 and its surroundings on a nondetailed basis as compared with the high spatial resolution display discussed in connection with FIG. 4.

Accordingly, monitor 32 may selectively switch between the scenes 22' (FIG. 3) and 20' (FIG. 4). Alternatively, the high and low resolution portions of the image may be shown as split screens 32b and 32c similar to that accomplished in the Windows environment of personal computers.

In order to move the high spatial resolution focal plane 12 relative to the impinging image, it is necessary to move the mirror 10 relative to the field of view. This is easily accomplished by a conventional motor 37 having its output shaft connected to a conventional drive 38, the drive being connected to mirror 10 by a connection generally indicated by reference numeral 40. The motor 37 may incorporate a servomechanism.

As thus described, movement of mirror 10 varies the position of a high spatial resolution area within a field of view. A computer monitor displays the scene being viewed, and including an area of a high resolution. As will be appreciated, this is effected by the utilization of relatively few photodetectors thus resulting in great savings and lower processing time.

It should be understood that the invention is not limited to the exact details of construction shown and described herein for obvious modifications will occur to persons skilled in the art.

I claim:

1. A variable spatial resolution focal plane assembly comprising:

an inclined plane mirror upon which an original image falls, the mirror reflecting a modified image;

a first focal plane having relatively densely positioned photodetectors physically mounted to a central portion of the mirror for generating a high spatial resolution signal corresponding to a first area within the original image;

an optical member for reimaging the reflected modified image to a second focal plane of less densely positioned photodetectors for generating a low spatial resolution signal corresponding to the remaining area of the original image;

means for moving the mirror and selectively aligning the first focal plane with different areas of the incident original image;

whereby greater image detail is obtained from the high spatial resolution signal while less image detail is simultaneously obtained from the low spatial resolution signal; and means connected to the resolution signals for displaying the image detail of the high spatial resolution signal superimposed on the image detail of the low spatial resolution signal.

2. A method for displaying a high resolution image area superimposed upon a larger lower resolution image area comprising the steps:

directing an original image to fall incident upon an inclined image plane;

generating a high spatial resolution signal corresponding to a focal plane area within the original image plane;

selectively positioning the focal plane area relative to the incident original image;

reflecting, from the image plane, a modified image which includes the original image less an image portion on the focal plane area;

reimaging the reflected modified image;

generating a low spatial resolution signal corresponding to the reflected modified original image; and connecting the high and low spatial resolution signals for displaying the image detail of the high spatial resolution signal superimposed on the image of the low resolution signal.

* * * * *